(12) United States Patent
Lin et al.

(10) Patent No.: US 7,082,575 B2
(45) Date of Patent: Jul. 25, 2006

(54) SYSTEM USING GRAPHIC INTERFACE TO PERFORM STOCK MANAGEMENT

(75) Inventors: Kuang-Shin Lin, Taipei (TW); Jeff Song, Taipei (TW); Yi-Song Li, Tianjin (CN)

(73) Assignee: Inventec Corporation, Taipei (TW)

( * ) Notice: Subject to any disclaimer, the term of this patent is extended or adjusted under 35 U.S.C. 154(b) by 755 days.

(21) Appl. No.: 10/179,948

(22) Filed: Jun. 26, 2002

(65) Prior Publication Data

US 2003/0001876 A1   Jan. 2, 2003

(30) Foreign Application Priority Data

Jun. 27, 2001   (TW) ............................... 90115501 A (51) Int. Cl.
    *G06Q 20/00* (2006.01)
(52) U.S. Cl. ........................... 715/771; 705/29; 705/22
(58) Field of Classification Search ................ 715/771; 705/22, 29
    See application file for complete search history.

(56) References Cited

U.S. PATENT DOCUMENTS 6,026,378 A * 2/2000 Onozaki ...................... 705/28
6,744,436 B1 * 6/2004 Chirieleison et al. ....... 345/427
6,801,901 B1 * 10/2004 Ng ............................... 705/28
2003/0110102 A1 * 6/2003 Chien et al. .................. 705/28

* cited by examiner

*Primary Examiner*—Raymond J. Bayerl
*Assistant Examiner*—Dennis G. Bonshock
(74) *Attorney, Agent, or Firm*—Birch, Stewart, Kolasch & Birch, LLP (57) ABSTRACT

A system that uses a graphic interface to perform stock management is disclosed. It is comprised of a database to store data needed for stock management and to link each of the following modules to perform stock management using the graphic interface. The modules include a stock allocation designing module, which helps a user decide the size of a stock, storage areas, storage space and relevant attributes according to practical needs; a data receiving module, which receives the data of the stock, the storage areas, the storage space and a plurality of goods; a stock layout generating module, which plots a stock layout according to the data received by the data receiving module; a stock operating module, which displays messages corresponding to the operations the user has performed on the stock layout; and a data storage module, which saves the results of the operations performed on the stock layout by the user in the database.

14 Claims, 8 Drawing Sheets

SYSTEM USING GRAPHIC INTERFACE TO PERFORM STOCK MANAGEMENT

BACKGROUND OF THE INVENTION

1. Field of the Invention

The invention relates to a stock management system and, in particular, to a system that uses a graphic interface to perform stock management.

2. Related Art

In conventional production-distribution systems, stock performs the roles of "storage" and "maintenance". However, under the pressures of new consumer demands, huge amounts of complicated data, and competitive markets, goods must enter and leave a stock system in a rapid and complicated manner so as to achieve proper timing and satisfy the market's requirements of quantity and variety. Therefore, a dynamic management function for stock systems has become more important than the simple maintenance function in conventional stock. The dynamic management function combines the conventional stock system and the currently popular data warehouse system. The purpose of such a combination is to plan and manage storage space so as to effectively control the sources, destinations and fluctuations of goods.

Along with the changes in the consumer market, the industry faces a competitive environment with rapid changes, low inventory (null inventory), fast responses, and high customer satisfaction guarantee requirements. A complete supply chain system is a key factor for a company's success. In particular, the designs of the stock and distribution network systems determine the operational efficiency of the whole supply chain system.

In the prior art, the applications of data warehousing focus on providing accurate and integrated data to the marketing, financial, stocking, manufacturing, and other units in the enterprise that are in need of information to make decisions. Information established by each operating unit in the enterprise can provide a knowledge database for employees to search. This is particularly useful in providing integrated observations of the enterprise such as integrated sales, manufacturing and inventory data.

However, conventional data warehousing systems have a data updating cycle of one month or one week, and data searches and modifications are usually initiated within a group-oriented environment (sometimes completed by manual operations). These processes often take quite a long time. Thus, typical applications can be processed in real time during the daytime. Such batch tasks as client classification, inventory management, distribution flows, profit computations, and predictive model estimations and analyses cannot be fed back into the operating system within a short period of time to serve as references for better decisions.

Accordingly, applications of data warehousing will greatly enlarge the scope of the technology in the field. Event estimations for online users should be done quickly and a minimal response time is required. Such requirements must be implemented in the conventional decision-supported large database and should apply to complicated searches. In addition, data access has to be closer to a real-time response than conventional data warehousing.

Nowadays, many stock management systems do not have a sufficient number of functions. Without a client operating interface, the following situations occur: (a) the client rents space from a host stock and directly operates using the client's stock management system; (b) the client does not use its own stock management system and the host enters data for the client; and (c) stock operation information is entered repeatedly (in both the client and the host systems). This is all because the production distribution information cannot be transmitted or shared, causing a cycle of bad production distribution quality.

In current production distribution systems or warehouse management systems, table views or table browsers are widely used to organize and manipulate data. Although table views are detailed and well organized, the data presentation is not intuitive and the data are difficult to manipulate. To obtain useful information one usually needs to go through complicated searches or inspection. Even if auxiliary means such as circle graphs, curve graphs, or rectangular graphs are employed, the user can only roughly understand the situation without being able to complete meaningful operations.

In view of the foregoing, an intuitive, simple and graphic operation management interface is an urgent need in stock management systems.

SUMMARY OF THE INVENTION

The invention provides a stock management system using a graphic interface. An objective of the invention is that the graphic interface is used to implement stock management designs and provide access to messages. It reflects actual storage areas, storage locations and sizes, and the quantities and status of goods. It also implements maintenance to the system. One can perform storage location moves and mergers for stock goods through the graphic interface. Reasonable rules are also provided for database modifications and maintenance.

Another objective of the invention is to automatically suggest storage location moves and mergers that satisfy the rules so as to consolidate stock space.

The disclosed stock management system using a graphic interface contains at least a database to store data needed for stock management and to link each of the following modules to perform stock management using the graphic interface. The modules include a warehouse allocation designing module, which helps a user decide the size of a stock, its storage areas, its storage space and other relevant attributes according to practical needs; a data receiving module, which receives the data of the stock, the storage areas, the storage space and a plurality of goods; a stock layout generating module, which plots a stock layout according to the data received by the data receiving module; a stock operating module, which displays messages corresponding to the operations the user has performed on the stock layout; and a data storage module, which saves the results of the operations performed on the stock layout by the user in the database.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Any successful data warehouse application must be combined with functions for stock management. This necessarily requires improvement in order to make substantial contributions to a successful enterprise. Thus, active data warehousing has become an important subject that provides new functions to the enterprise mainstream. The main challenge in establishing an active data warehouse application lies in providing an immediate response time for approximate trade variations estimated online that can satisfy the real-time requirements of the supplier, the inventory and the customer.

However, the invention utilizes a graphic interface to implement stock designs and to provide an intuitive display for stock data. A user can perform stock data maintenance, and since the graphic interface reflects the situation clearly and accurately, the user can easily understand the details of a stock.

Figure 1:
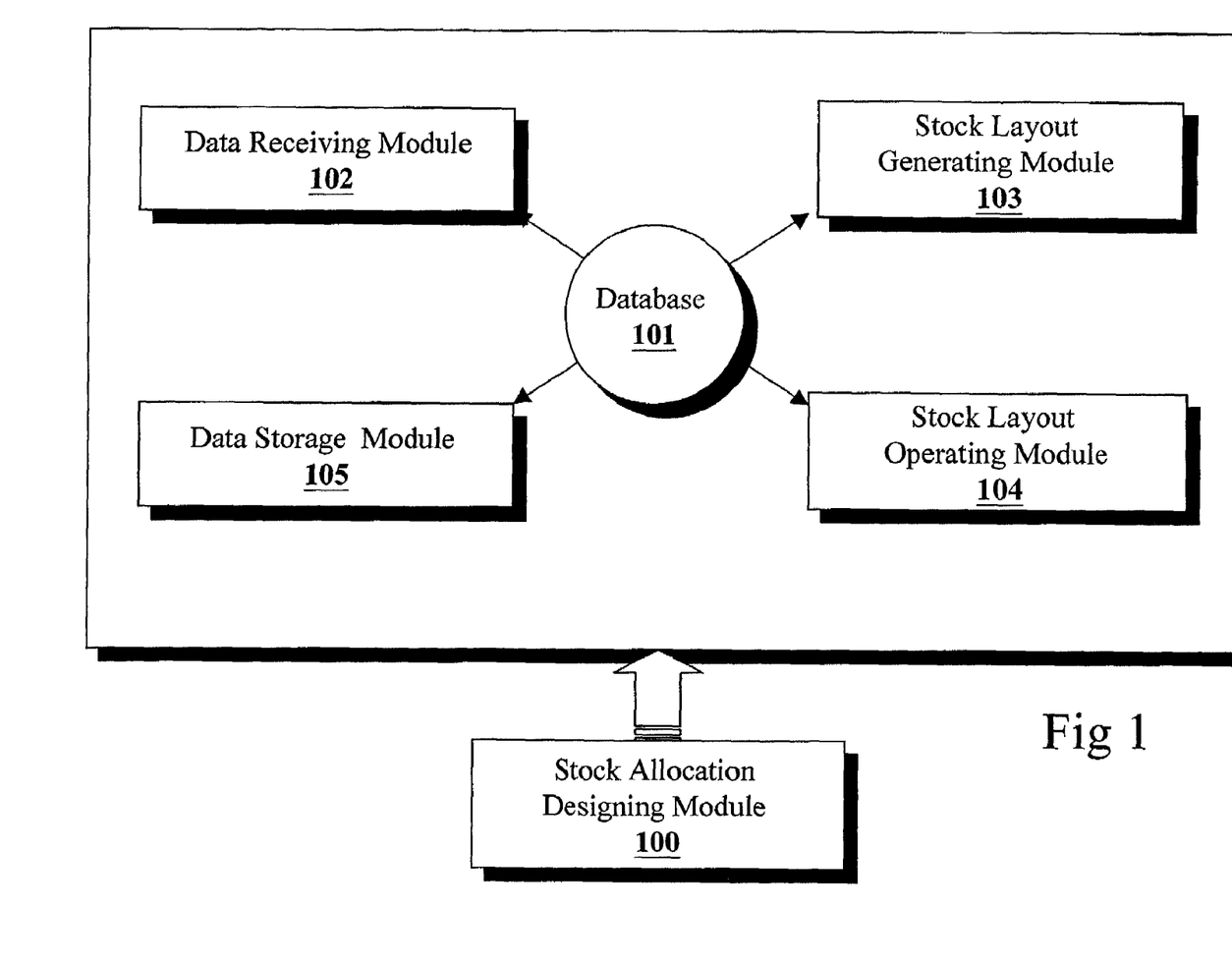
FIG. 1 is a block diagram of the main functional modules in the invention.

The main functional modules of the invention are shown in FIG. 1, which includes a stock allocation designing module 100, a database 101, a data receiving module 102, a stock layout generating module 103, a stock layout operating module 104, and a data storage module 105. The stock allocation designing module 100 is an independent module for the user to design the size of the stock, its storage areas and storage locations, and other relevant parameters according to practical needs. The database 101 stores data for stock management. The data receiving module 102 receives messages of the stock, the storage areas, the storage location and good data. The stock layout generating module 103 plots a stock layout according to the messages received by the data receiving module 102. The stock layout operating module 104 displays messages corresponding to the operations done by the user on the stock layout and completes the designated functions. The data storage module 105 stores the results of the operations done by the user on the stock layout in the database. The function and detailed procedure of each of the above-mentioned modules are described as follows.

Figure 2:
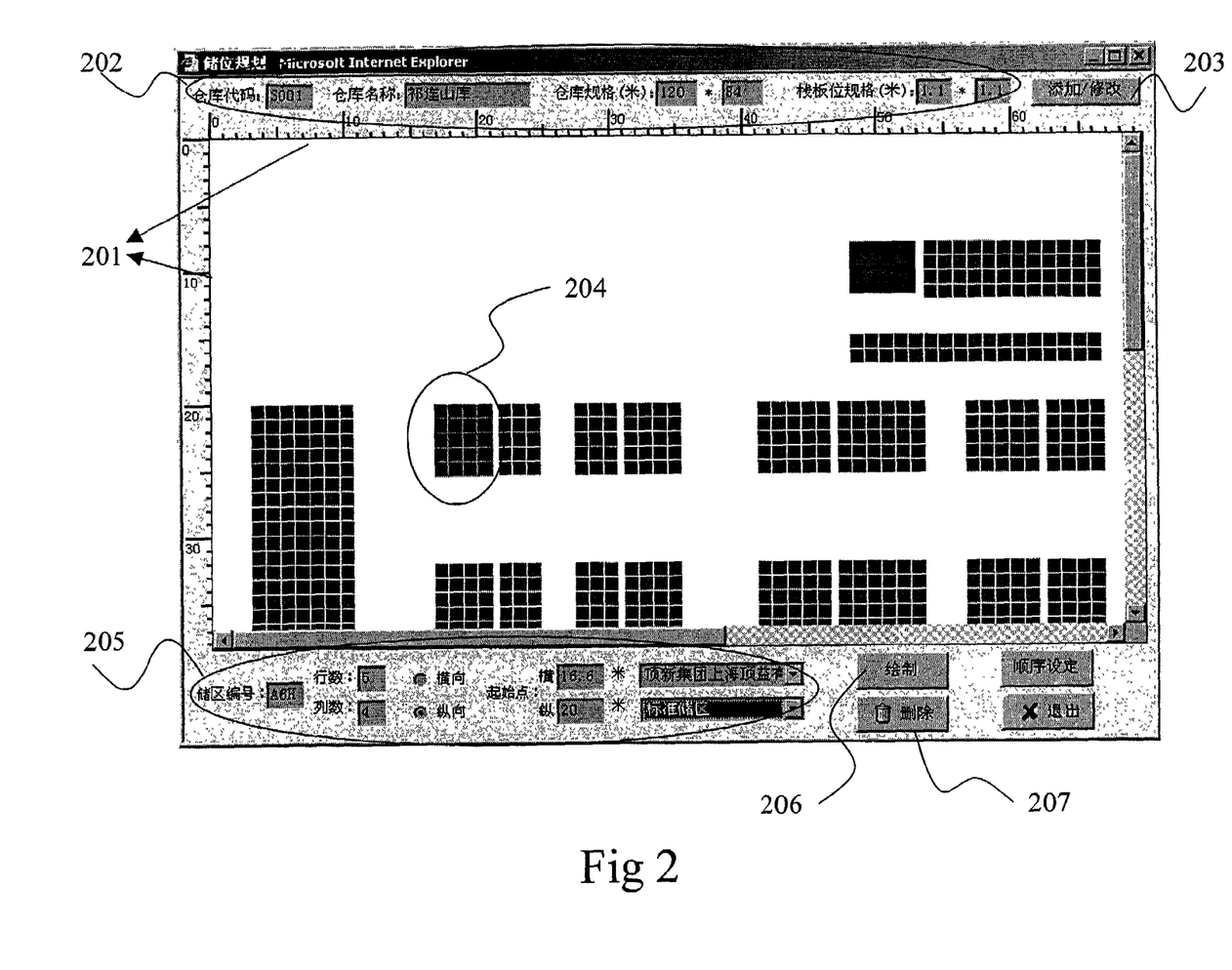
FIG. 2 is a schematic view of the stock allocation designing module of the invention.

(1) The Stock Allocation Designing Module 100:

This module is shown in FIG. 2. Rulers 201 are provided along a vertical axis and a horizontal axis for the user to locate a storage area. A stock message panel 202 is used to display stock related messages, such as the warehouse code, the stock name, the stock specifications, and the storage base sizes. Moreover, an ADD/MODIFY button 203 is provided to add and/or modify the design of the storage locations. The storage area graph 204 reflects actual storage locations and sizes. The storage area message panel 205 has detailed messages about the storage area, such as the storage area number, the row number, the column number, the initial point, and the customer name. Through the function of plotting a new storage area 206, a new storage area can be generated according to the messages entered by the user, and the corresponding storage area graph is formed. A DELETE button 207 is also provided to delete a designated storage area. The corresponding messages in the database 101 are also deleted.

Figure 3:
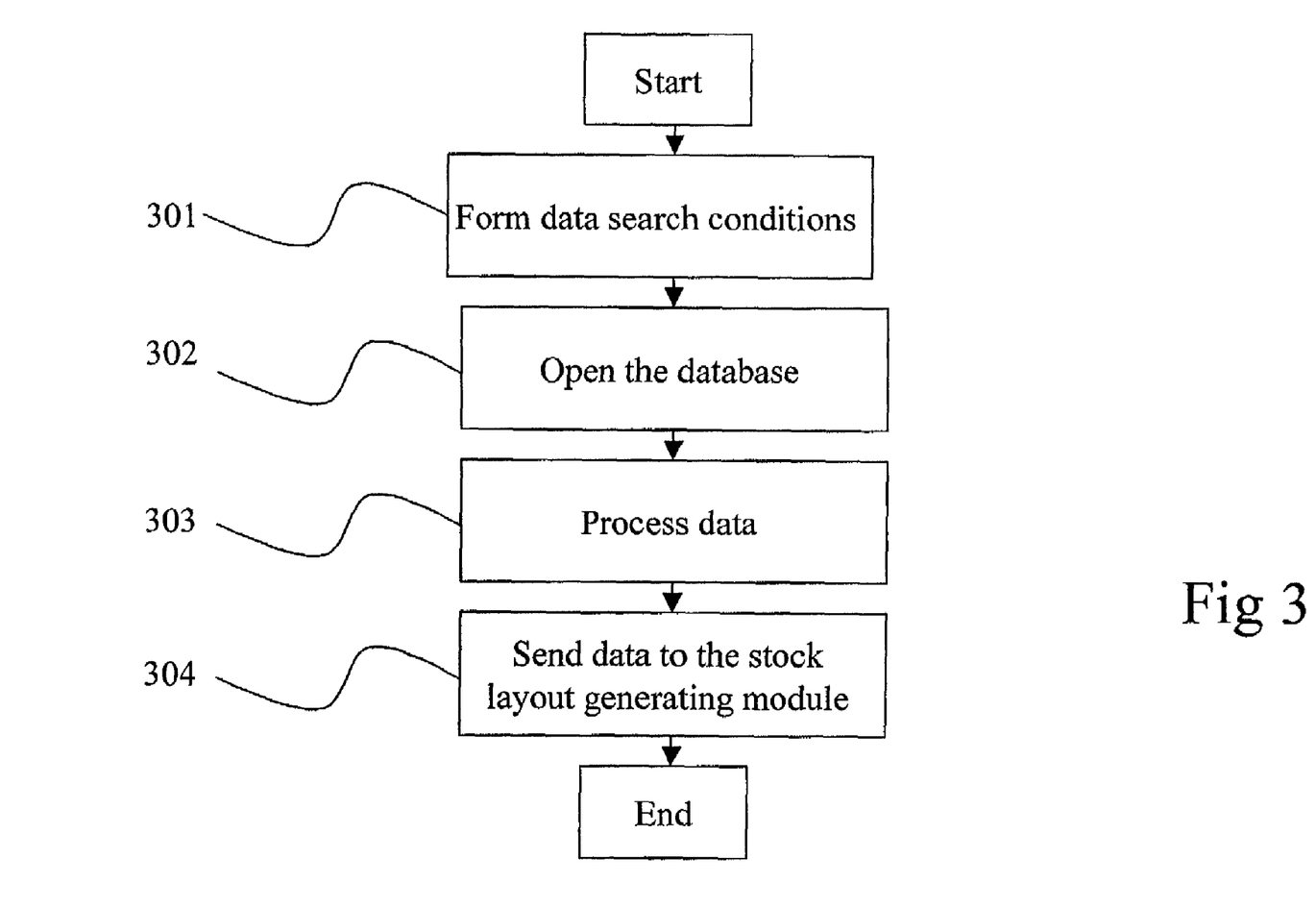
FIG. 3 is a flowchart of the data-receiving module of the invention.

(2) The Data Receiving Module 102:

This module is shown in FIG. 3. Data search conditions are first formed in step 301 to obtain messages of the stock and commodities. The database is then opened in step 302 to obtain the required data. Afterwards, data are processed in step 303 to produce the data needed for processing the stock layout. Finally, the data are sent to the stock layout-generating module 304. The data receiving procedure is thus completed.

Figure 4:
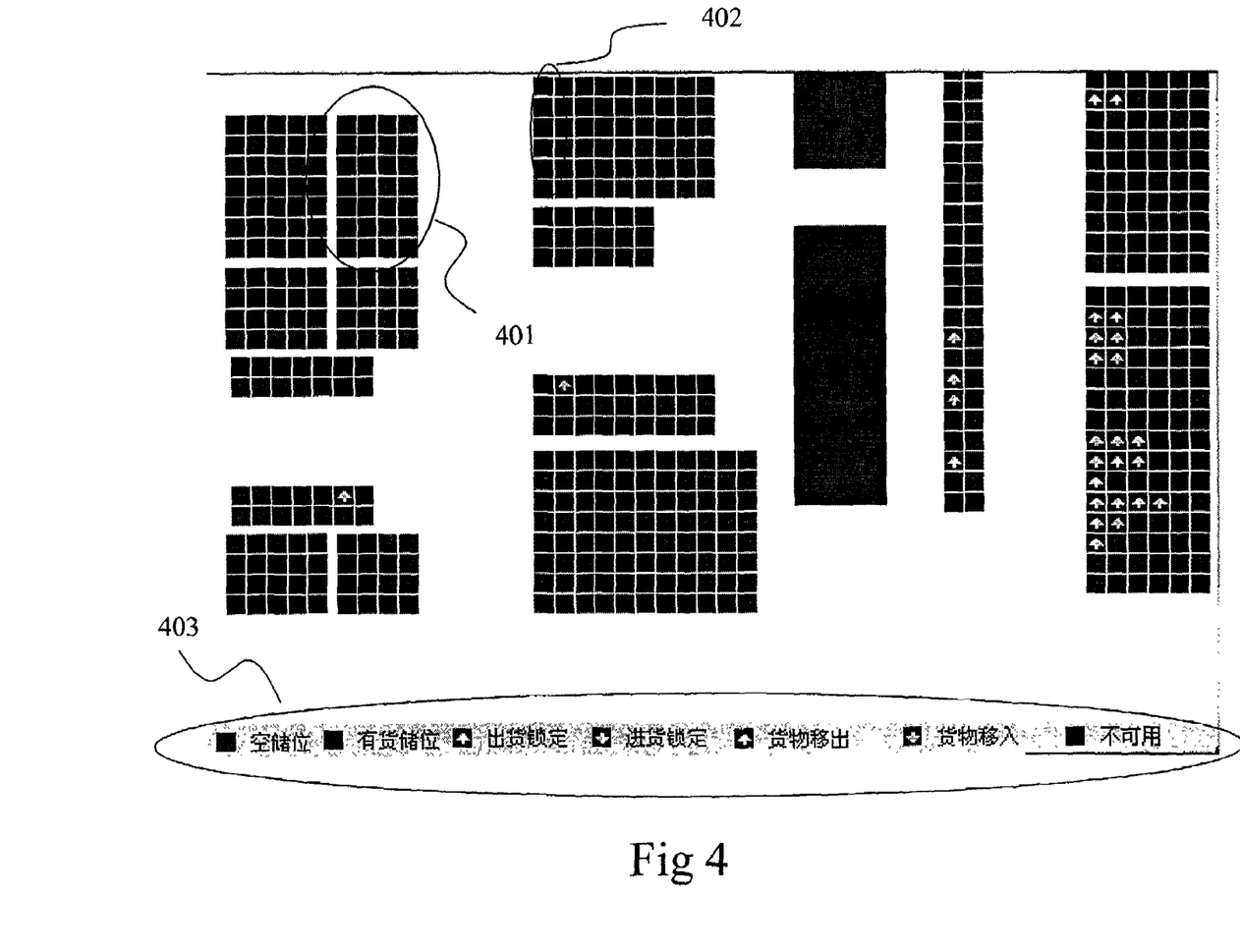
FIG. 4 is a schematic view of a local stock.

(3) The Stock Layout Generating Module 103:

As shown in FIG. 4, a storage area 401 refers to a partitioned area in a stock. Each storage area is further divided into M rows and N columns, accommodating M*N commodity bases, where M and N are natural numbers. A storage location 402 refers to one row in a storage area 401, which is one unit for disposing goods. A storage location status legend bar 403 is further provided to display the status of a stock layout. Possible statuses include vacant storage locations, occupied storage locations, delivery lock-in, arrival lock-in, item moving-out, and item moving-in labeled by different icons or colors.

Figure 5:
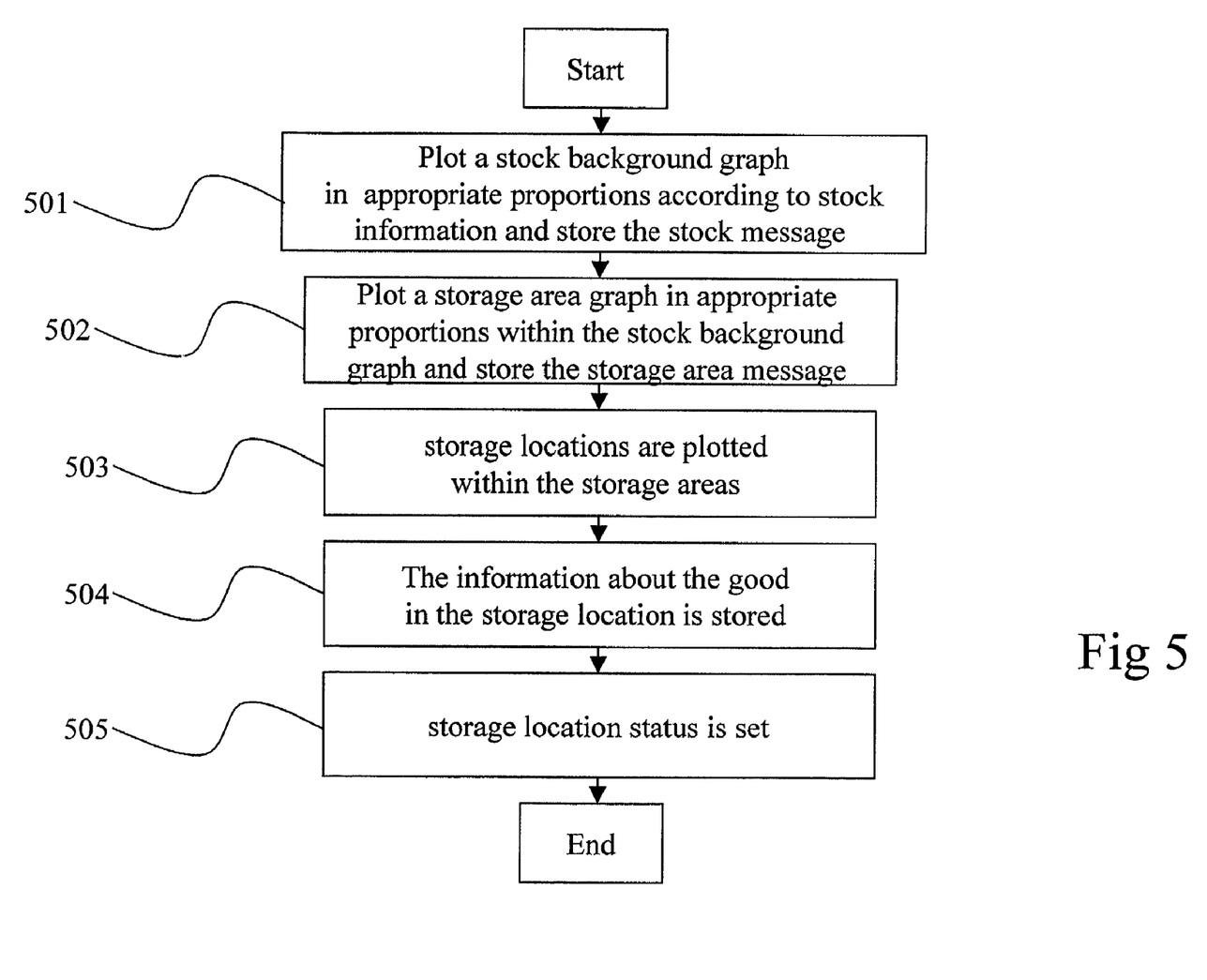
FIG. 5 is a flowchart of the stock layout-generating module.

The procedure of this module is shown in FIG. 5. A stock background graph is plotted in appropriate proportions according to the stock messages, and the stock messages are stored (step 501). Storage areas are then plotted in proportion within the stock background graph and the storage area messages are stored (step 502). Afterwards, storage locations are plotted within the storage areas (step 503). In accordance with the storage location messages, the storage locations can be both horizontal and vertical. Therefore, they have to be processed independently. Each non-vacant storage location has one type of item. The information about the item in the storage location is stored in step 504. Finally, the storage location status is set in step 505. Different colors and icons are used to represent different item statuses. For example, green icons indicate vacant storage locations, red ones indicate lock-in status of the delivery and arrival of goods, and blue ones indicate normal occupied storage locations.

Figure 6:
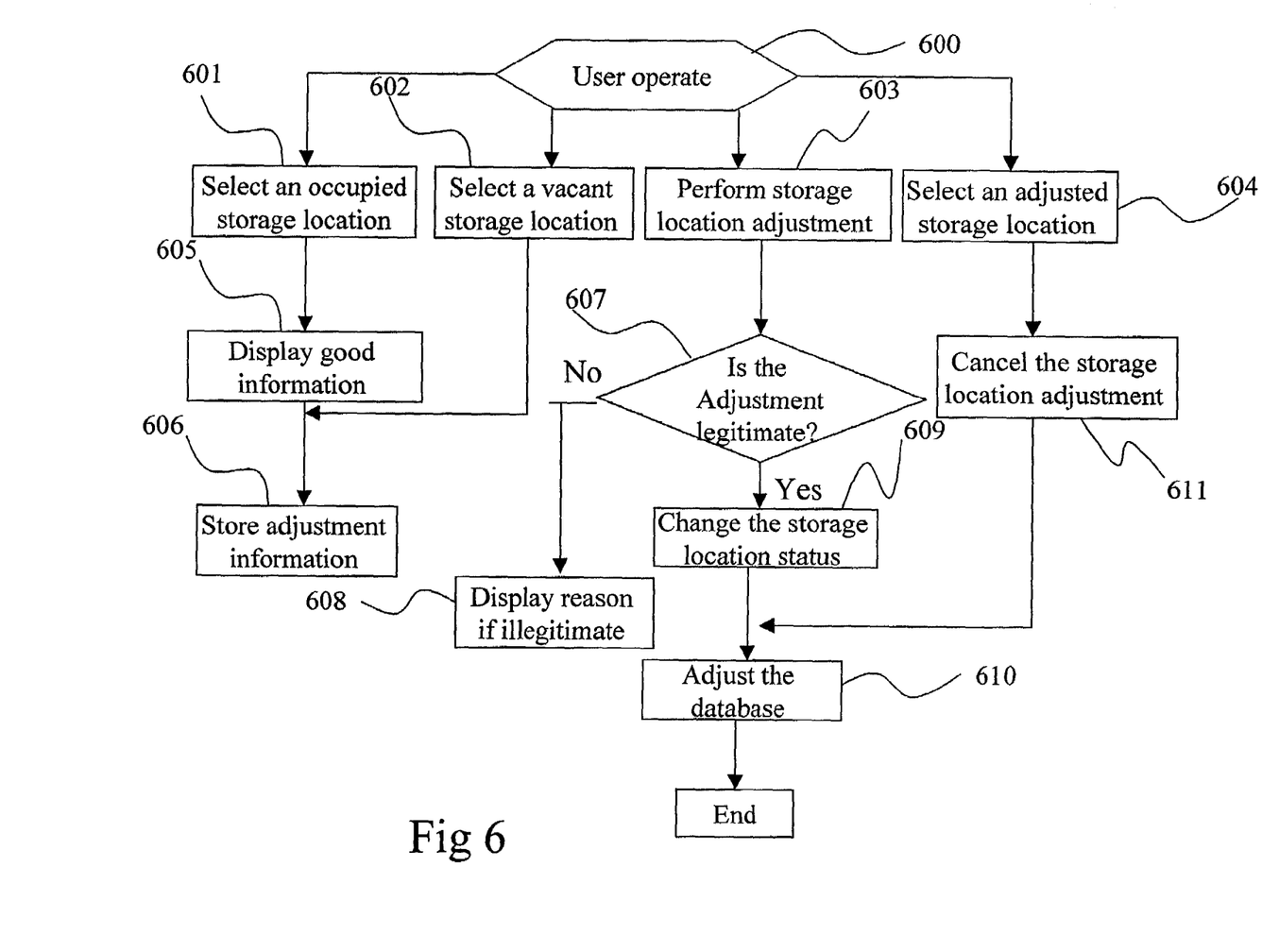
FIG. 6 is a flowchart of the stock layout-operating module.

(4) The Warehouse Layout Module 104:

The procedure of this module is shown in FIG. 6. Through the user operations (step 600), a user can choose the functions for selecting an occupied storage location (step 601), selecting a vacant storage location (step 602), performing storage location adjustment (step 603), and selecting an adjusted storage location (step 604).

When the user selects an occupied storage location in step 601, the system obtains detailed storage location and commodity data. After the selection, the commodity information is shown in the message area (step 605) for the user's reference. At the same time, the commodity information is stored according to the user's selection (step 606) so that the user can adjust the stock data in the next step.

The user can select a vacant storage location in step 602. The system stores the user's selection as the adjustment information (step 606) for the user to adjust the stock data in the next step.

If the user performs the storage location adjustment using the method provided by the system (step 603), certain rules are used to determine whether an adjustment is legitimate (step 607). If illegitimate, the system displays the reason why (step 608). If legitimate, then relevant storage location statuses are changed on the stock layout (step 609). The data storage module is then called to adjust the database contents (step 610).

If the user first selects an adjusted storage location (step 604) and then cancels the storage location adjustment operation (step 611), the system cancels previously completed adjustments. The data storage module is then called to adjust the database contents (step 610).

The user can also utilize the automatic suggestion function for the system to follow certain rules and user defined settings to list all allowed adjustment contents so that the user can determine whether an adjustment is needed.

The above-mentioned rules include:

1. Different goods cannot be in the same storage location;
2. The combination date for the same goods cannot surpass a predetermined interval limit;
3. The quantities after the storage location combination cannot exceed the capacity of the storage locations;

4. The goods quantity disposed in a vacant storage location cannot exceed the capacity of the vacant storage location; and 5. Delivery and arrival locked-in goods cannot be adjusted.

Figure 7:
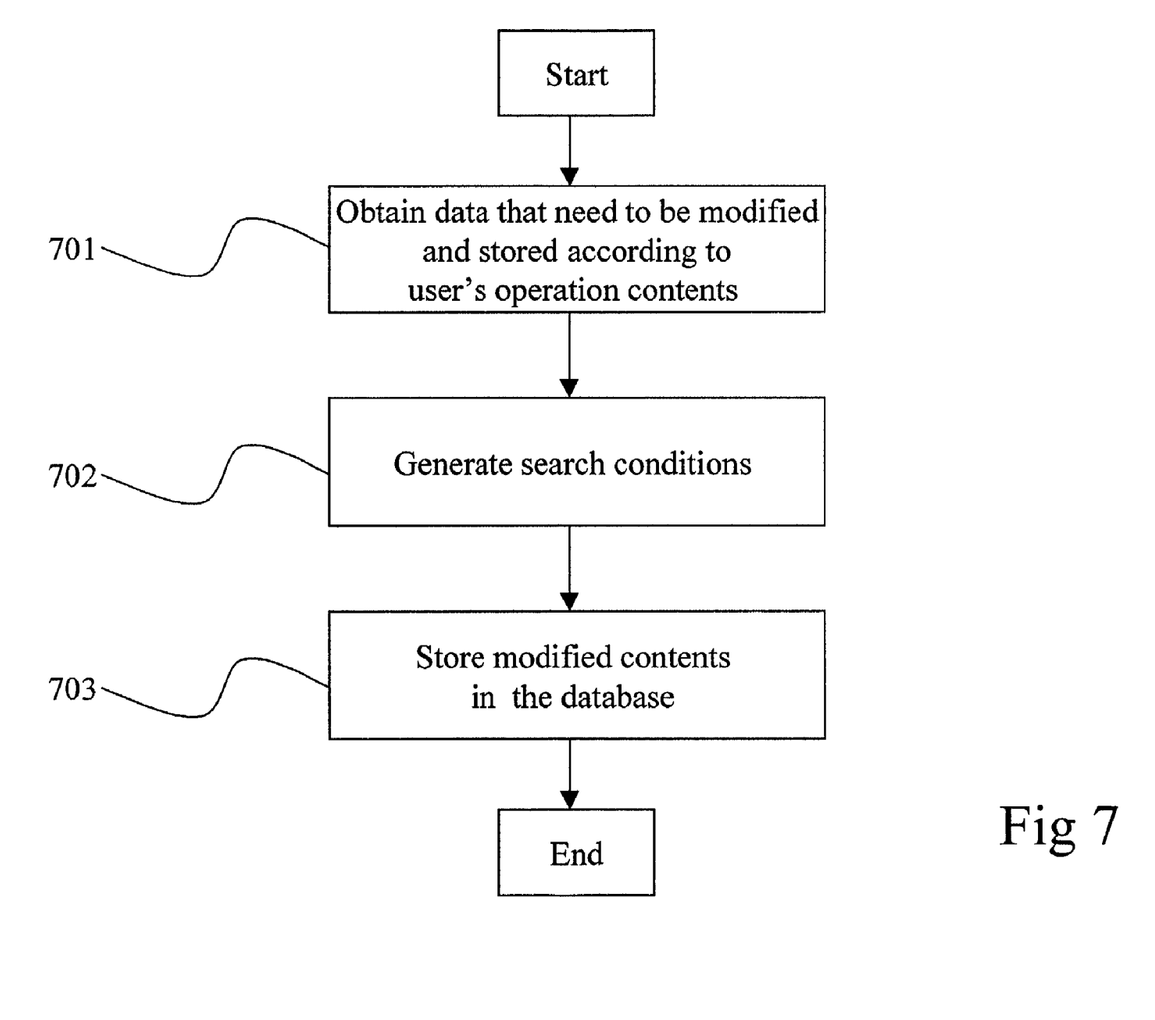
FIG. 7 is a flowchart of the data storing module.

(5) The Data Storage Module 105:

The procedure of this module is shown in FIG. 7. Step 701 follows the user's operation contents to obtain data that need to be modified and stored. Step 702 generates search conditions. Step 703 then stores the modified contents in the database.

Figure 8:
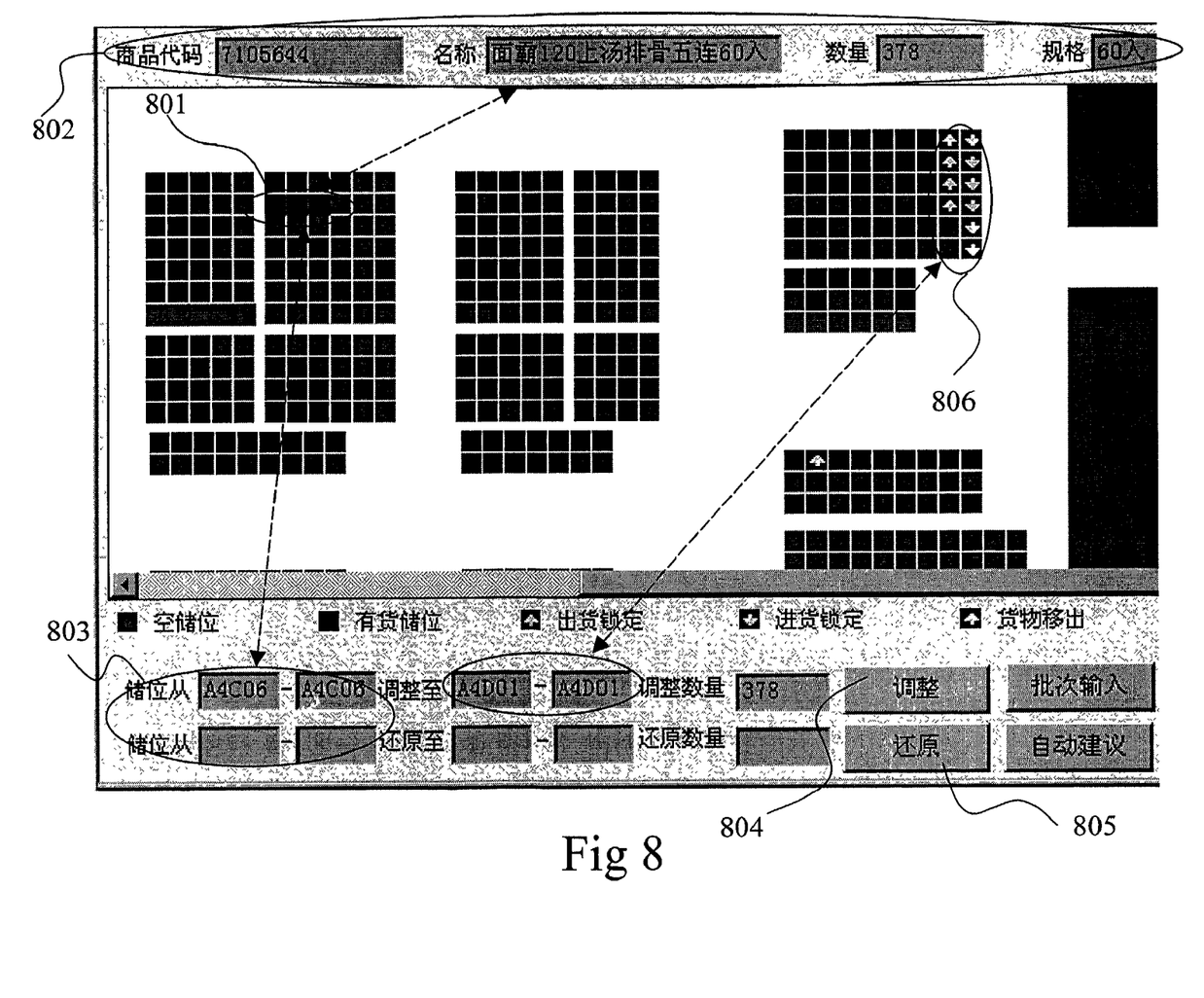
FIG. 8 is a schematic view showing a preferred embodiment of stock management.

FIG. 8 is a schematic view showing a preferred embodiment of stock management. It illustrates that a graphic interface is used for a logistics distribution stock management subsystem. The subsystem can utilize user-friendly visual effects to satisfy users' requirements for checking stock conditions and adjusting stock data. The user can use a mouse or other clicking control devices, such as a digital touch-control panel or keyboard, to select an occupied storage location 801. The user can simultaneously refer to displayed item information 802 and storage location numbers 803. An adjustment icon 804 can be used to adjust the user-designated selection. A recovery icon 805 can undo the user's adjustment. These actions are completed through the graphic interface. The corresponding messages in the database 101 (referring to FIG. 1) are also updated. The adjusted storage location 806 can be tagged by the corresponding icon or color.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stock management system using a graphical interface generated by a warehouse layout generating module containing a storage location status legend bar displaying at least six statuses of the store location in the warehouse layout for a real-time response data warehousing, which comprises:

a database, which stores data for the stock management and links each of the following modules for performing the graphical interface stock management;

a warehouse allocation designing module, which allows a user to design the sizes of a stock, its storage areas and storage locations along with relevant parameters according to practical needs;

a data receiving module, which receives the data of the stock, the storage areas, the storage locations and a plurality of goods;

the stock layout generating module, which plots a warehouse layout according to the data received by the data receiving module wherein the operation interface generated by the warehouse layout generating module contains the storage location status legend bar for displaying the statuses of the storage locations in the warehouse layout, and the storage location status legend bar shows possible statuses of vacant storage locations, occupied storage locations, delivery lock-in, arrival lock-in, commodity moving-out, and commodity moving-in labeled by different icons or colors;

a warehouse layout operating module, which displays a message corresponding to the operations done by the user to the warehouse layout; and a data storing module, which stores the warehouse layout operations done by the user in the database.

2. The system of claim 1, wherein the warehouse allocation designing module includes horizontal and vertical rulers for the user to determine the locations of the storage areas.

3. The system of claim 1, wherein the storage allocation designing module further contains a warehouse message panel to display messages about the warehouse.

4. The system of claim 3, wherein the warehouse message panel shows a warehouse code, a warehouse name, a warehouse specification and a storage base specification.

5. The system of claim 1, wherein the storage allocation designing module further includes a warehouse ADD/MODIFY button to add and modify the design of the storage locations.

6. The system of claim 1, wherein the warehouse allocation designing module further includes a storage area diagram to reflect the locations and sizes of actual storage areas.

7. The system of claim 1, wherein the warehouse allocation designing module further includes a storage area message panel to record detailed information of the storage areas.

8. The system of claim 7, wherein the storage area message panel shows a storage area number, a row number, a column number, an initial point and a client name.

9. The system of claim 1, wherein the data receiving module executes the steps of:

generating data searching conditions to obtain the information of the warehouse and the good;

opening the database to obtain the required data;

processing data to generate data satisfying the warehouse layout processing requirements; and sending the data to the warehouse layout generating module, thus completing data reception.

10. The system of claim 1, wherein the operation interface generated by the warehouse layout generating module further contains a plurality of storage areas for disposing a plurality of item storage bases.

11. The system of claim 10, wherein the plurality of storage areas further contains a plurality of storage locations, each being a unit for storing goods.

12. The system of claim 1, wherein the stock layout generating module executes the steps of:

plotting a warehouse background graph in an appropriate proportion according to the stock data and storing the stock data;

plotting the storage areas in proportion according to the stock background graph and storing the storage location data;

plotting the storage locations in the storage area graphs and performing horizontal and vertical storage location processing according to the storage location data; and setting the status of each of the storage locations by providing different colors and icons.

13. The system of claim 1, wherein the stock layout operating module performs an operation selected from the group comprising selecting an occupied storage location, selecting a vacant storage location, adjusting, a storage location, and selecting an adjusted storage location.

14. The system of claim 1, wherein the data storing module executes the steps of:

obtaining data that needs to be modified fled and stored according to the user's operation contents;

generating search conditions; and storing the modified data to the database.

* * * * *